(12) United States Patent
Marrotte et al.

(10) Patent No.: US 12,271,281 B2
(45) Date of Patent: Apr. 8, 2025

(54) AVAILABILITY ZONE FAULT INJECTOR FOR CLOUD COMPUTING ENVIRONMENTS

(71) Applicant: Dell Products L.P., Round Rock, TX (US)

(72) Inventors: Michael Marrotte, Windermere, FL (US); John P Marchese, Jr., East Hampton, CT (US); Jason Goldschmidt, Newton, MA (US)

(73) Assignee: Dell Products L.P., Round Rock, TX (US)

(*) Notice: Subject to any disclaimer, the term of this patent is extended or adjusted under 35 U.S.C. 154(b) by 14 days.

(21) Appl. No.: 18/363,089

(22) Filed: Aug. 1, 2023

(65) Prior Publication Data

US 2025/0045180 A1     Feb. 6, 2025

(51) Int. Cl.
| G06F 11/00 | (2006.01) |
| G06F 11/07 | (2006.01) |
| G06F 11/263 | (2006.01) |
| G06F 11/30 | (2006.01) |
| G06F 11/32 | (2006.01) |

(52) U.S. Cl.
CPC ............ *G06F 11/263* (2013.01); *G06F 11/07* (2013.01); *G06F 11/3034* (2013.01); *G06F 11/324* (2013.01)

(58) Field of Classification Search
CPC .... G06F 11/07; G06F 11/263; G06F 11/3034; G06F 11/324
See application file for complete search history.

(56) References Cited

U.S. PATENT DOCUMENTS

| 10,986,013 | B1* | 4/2021 | Theimer | G06F 11/3466 |
| 11,301,350 | B1* | 4/2022 | Byrne | G06F 11/263 |
| 11,573,874 | B2* | 2/2023 | Damodaran | G06F 16/90344 |
| 11,847,046 | B1* | 12/2023 | Ayyadurai | G06F 11/3684 |
| 2015/0161025 | A1* | 6/2015 | Baset | G06F 11/2028 714/38.1 |
| 2017/0024299 | A1* | 1/2017 | Deng | G06F 11/3414 |
| 2018/0285239 | A1* | 10/2018 | Papak | G06F 11/3644 |
| 2020/0264961 | A1* | 8/2020 | Davis | G06F 11/261 |
| 2020/0409810 | A1* | 12/2020 | Wu | G06F 11/2257 |

(Continued)

*Primary Examiner* — Jonathan D Gibson
(74) *Attorney, Agent, or Firm* — Amin, Turocy & Watson, LLP

(57) ABSTRACT

The technology described herein is directed towards fault injection to cloud provider resources, through a system that facilitates selection of specific resources in availability zone(s)/region(s). Example resources include VMs (virtual machines), VM clusters, tagged resource grouping and/or managed services. Based on (e.g., user) input data, the system injects faults to specified resources through cloud provider interfaces. The input data can specify availability zone(s), fault injection start time and duration. The input data can also specify fixed mode (fail specified resources together) or chaos mode (randomly inject failures for each resource individually). Failure type can be specified, e.g., graceful (e.g., clean shutdown) or non-graceful (e.g., a non-clean, hard fault). Based on the input, the system injects fault(s) using the modes selected to the specified resource(s) in the selected availability zone(s) for the duration entered. The user is provided the fault-related status information the during the duration.

20 Claims, 10 Drawing Sheets

(56) References Cited

U.S. PATENT DOCUMENTS

2021/0200525 A1* 7/2021 Shmouely ............ G06F 11/3688
2021/0374025 A1* 12/2021 Guan ................... G06F 11/0709
2021/0382815 A1* 12/2021 Chen ....................... G06F 21/52

* cited by examiner

AVAILABILITY ZONE FAULT INJECTOR FOR CLOUD COMPUTING ENVIRONMENTS

BACKGROUND

The cloud provides a fast and easy method for customers to spin up and down resources across multiple availability zones and regions, where an availability zone is a unit in the cloud that is separated by space within a region. Each region in the cloud is comprised of multiple zones. As a result, the cloud provides an environment that is suitable for running applications and services that require high availability via the multiple zones.

Applications and services can be tested for high availability by simulating a zone failure, and observing whether the failover that results was successful, along with what the overall impact was (or would be) to consumers of the service. Simulating a zone failure is a challenge today, as cloud providers do not provide such a feature or capability; for example, there is no way to inject faults to simulate a zone failure for a set of resources. Instead, administrators are on their own with respect to developing manual, custom solutions such as complicated maps/scripts to simulate availability zone faults. In addition, because former approaches are manual, they typically require a large amount of input from subject matter experts to make sure an approach will properly simulate a zone failure.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various embodiments of the technology described herein are generally directed towards facilitating the selection of one or more specific resources in one or more availability zone for applying fault(s) thereto. Faults can be applied in various ways, including in a fixed mode or random (chaos), including at a scheduled time or right away, and for a specified duration or until manually stopped. Further, a graceful failure mode (e.g., clean resource shutdown) or a non-graceful failure mode (e.g., a hard fault, akin to pulling the power cord of a specified resource or hardware underlying a specified resource such as a service) may be specified with respect to injecting fault(s).

As a result of the technology described herein, applications, services, hardware and so forth that need high availability can be tested for failover and the like before real failures occur in production. Failures can thus be identified in a controlled test environment.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal" and the like only represent objectives to move towards a more optimal state, rather than necessarily obtaining ideal results. Similarly, "maximize" means moving towards a maximal state (e.g., up to some processing capacity limit), not necessarily achieving such a state.

Embodiments of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
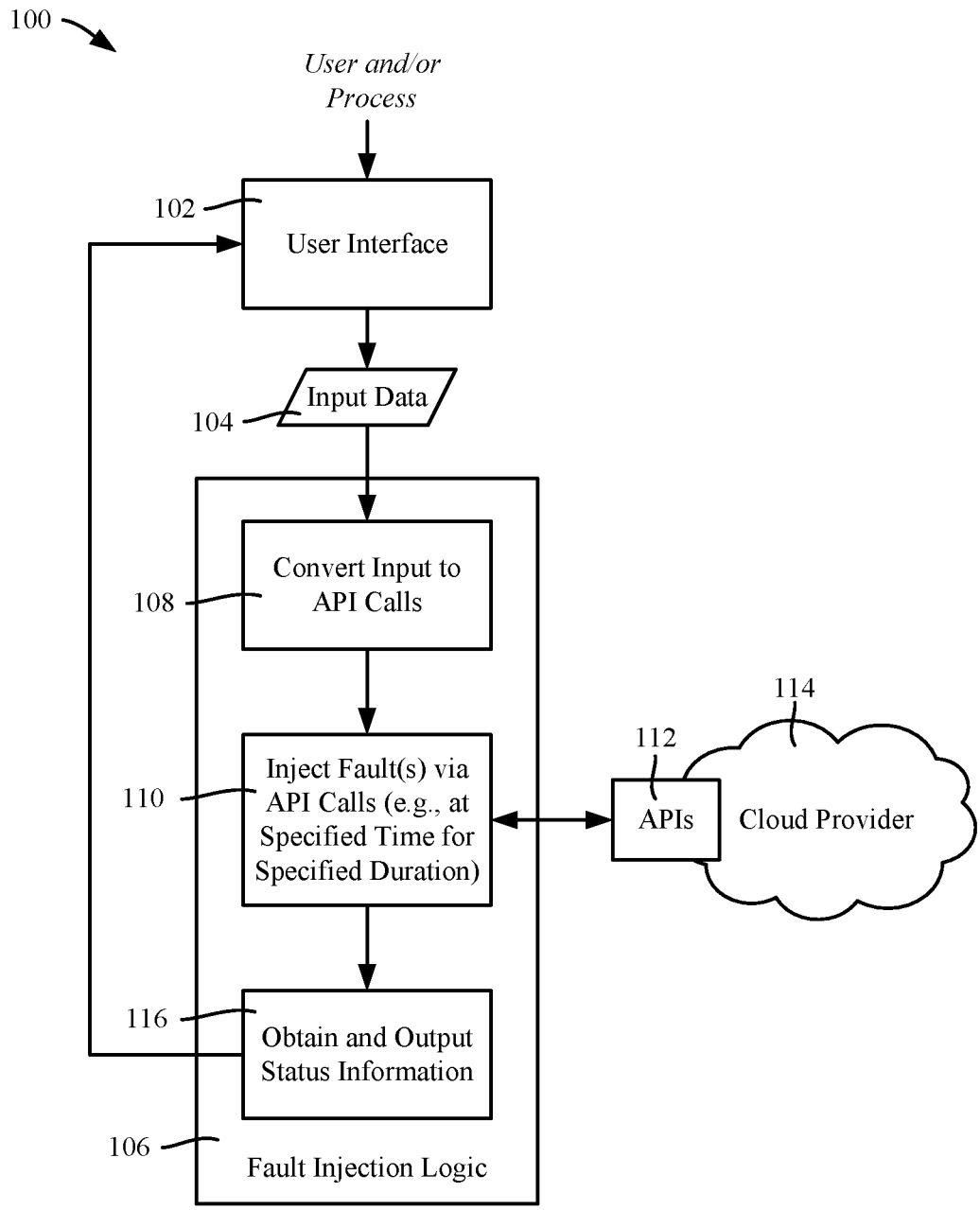
FIG. 1 is an example block diagram representation of an example system/architecture in which a fault or group of faults can be injected into a cloud provider's resources based on input data obtained via a user interface, in accordance with various embodiments and implementations of the subject disclosure.

FIG. 1 is an example representation of a system/architecture 100 in which a user interface 102 provides fault-related input data 104, as described herein, to fault injection logic

106. The user interface 102 can obtain the input data from a user, and/or from a process or the like, such as one that randomly tests resources, methodically tests resources, tests combinations of resources and so forth, such as based on administrator, tester and/or developer-defined testing scenarios. Faults can include, but are not limited to requesting that the cloud provider take some action with respect to a resource (which may depend on the resource type), e.g., delete, terminate, pause, stop, power down or perform some other fault-related action on an entity that can be failed.

In general, the input data related to resources can be converted to API calls (block 108) to directed to specified resources, as well as provide instructions to the fault injection logic 104 as to how, when and for how long to have the faults applied as described herein. At one or more times corresponding to the input data-provided instructions, the fault injection logic 104 injects the faults (block 110) via the APIs 112 of a cloud provider 114, e.g., at an input-data specified time for an input-data specified duration (if specified in the input data 104). Further, the fault injection logic obtains and outputs fault-related status information (block 116) to the user interface 102 (and/or logged to storage or the like) for analysis. As is understood, such status information may be automatically returned based on the API calls, pushed by the cloud provider 114 as fault-related events occur, and/or pulled from the cloud provider 114 in response to specific status request calls. Although not explicitly shown in FIG. 1, it is understood that that the status information can be automatically processed in some way (at least to an extent), such analyzed, summarized, reported, presented via notifications, logged and so on.

It should be noted that the fault injection logic 104/fault injection system can be located anywhere appropriate. For example, a fault injection system can be a standalone tool, located at a remote site, a tool integrated into a cloud provider's system/engine, a tool implemented in an enterprise's test environment, development environment, and so forth.

Figure 2:
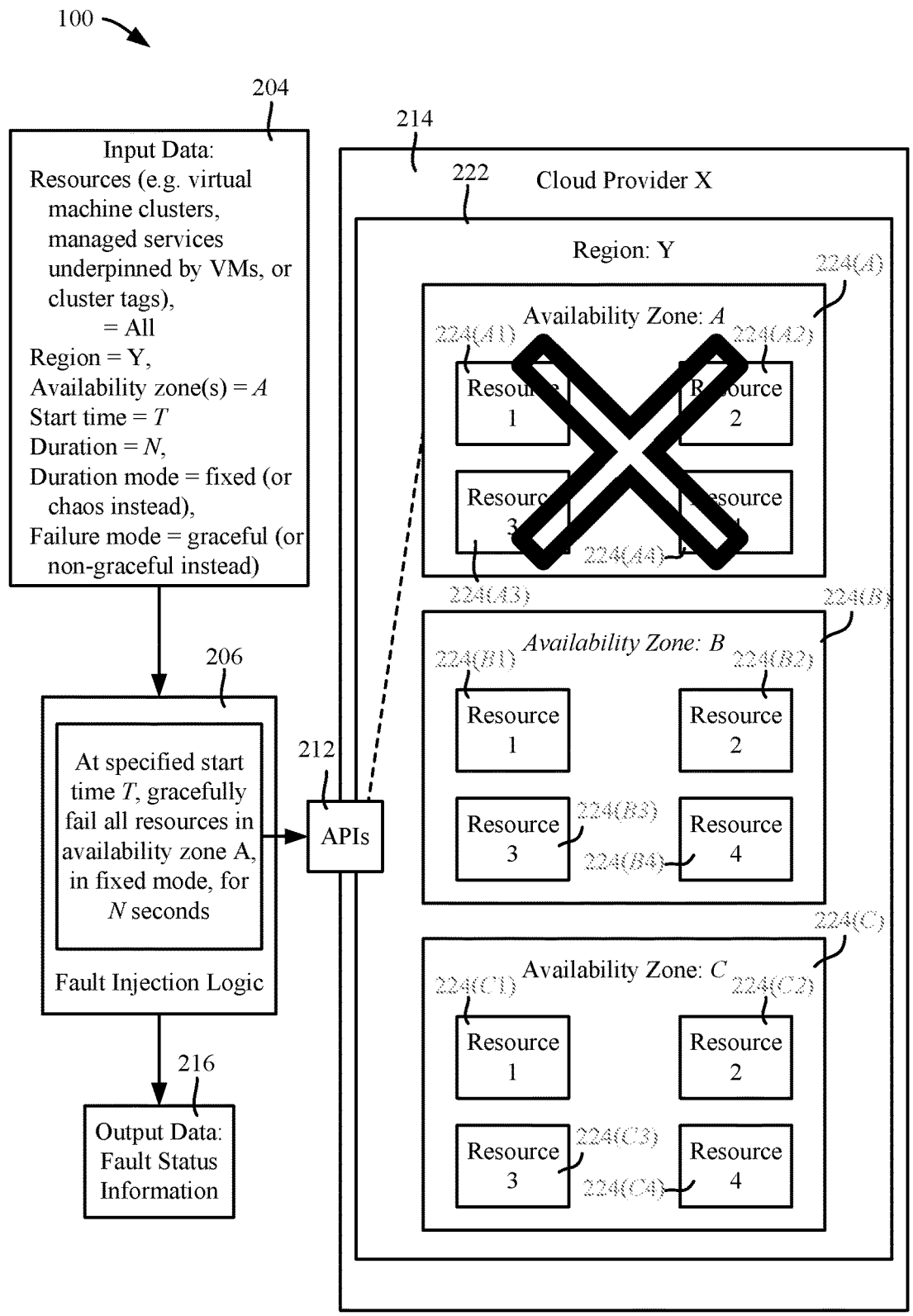
FIG. 2 is an example block diagram representation of an example system/architecture in which a fault or group of faults has been injected to fail an entire availability zone, in accordance with various embodiments and implementations of the subject disclosure.

FIG. 2 shows an example of injecting faults to fail entities (resources in this example) based on (an instance of) the input data 204. As can be seen in FIG. 2, the input data 204 includes, but is not limited to, identified resources, e.g., virtual machine (VM) clusters, managed services underpinned by VMs, or cluster tags (where cluster tags are metadata that can be attached to individual resources to group them together in the public cloud). Note that if not already known, the identified entities (e.g., references thereto/identifiers thereof) can be obtained by a suitable query to the cloud provider 214, which maintains metadata for each type of entity/resource.

As shown in FIG. 2, the cloud provider has resources of a region Y 222 arranged in three availability zones, availability zone A 224(A), availability zone B 224(B) and availability zone C 224(C). Each availability zone has instances of the same resources running; in this example, availability zone A 224(A) has resources 224(A1), 224(A2), 224(A3) and 224(A4), availability zone B 224(B) has resources 224(B1), 224(B2), 224(B3), and 224(B4), and availability zone C 224(C) has resources 224(C1), 224(C2), 224(C3) and 224(C4).

As can be seen in FIG. 2, in this example, the input data 204 has specified that at a specified start time T, the fault injection logic is to gracefully fail all resources (in fixed mode, that is together, rather than randomly) in availability zone A for a duration of N seconds. As represented by the large cross-out "x" character in the region Y 222, by injection of the correctly directed faults, the entire resources 224(A1), 224(A2), 224(A3) and 224(A4) of the availability zone A 224(A) are thus failed.

Figure 3:
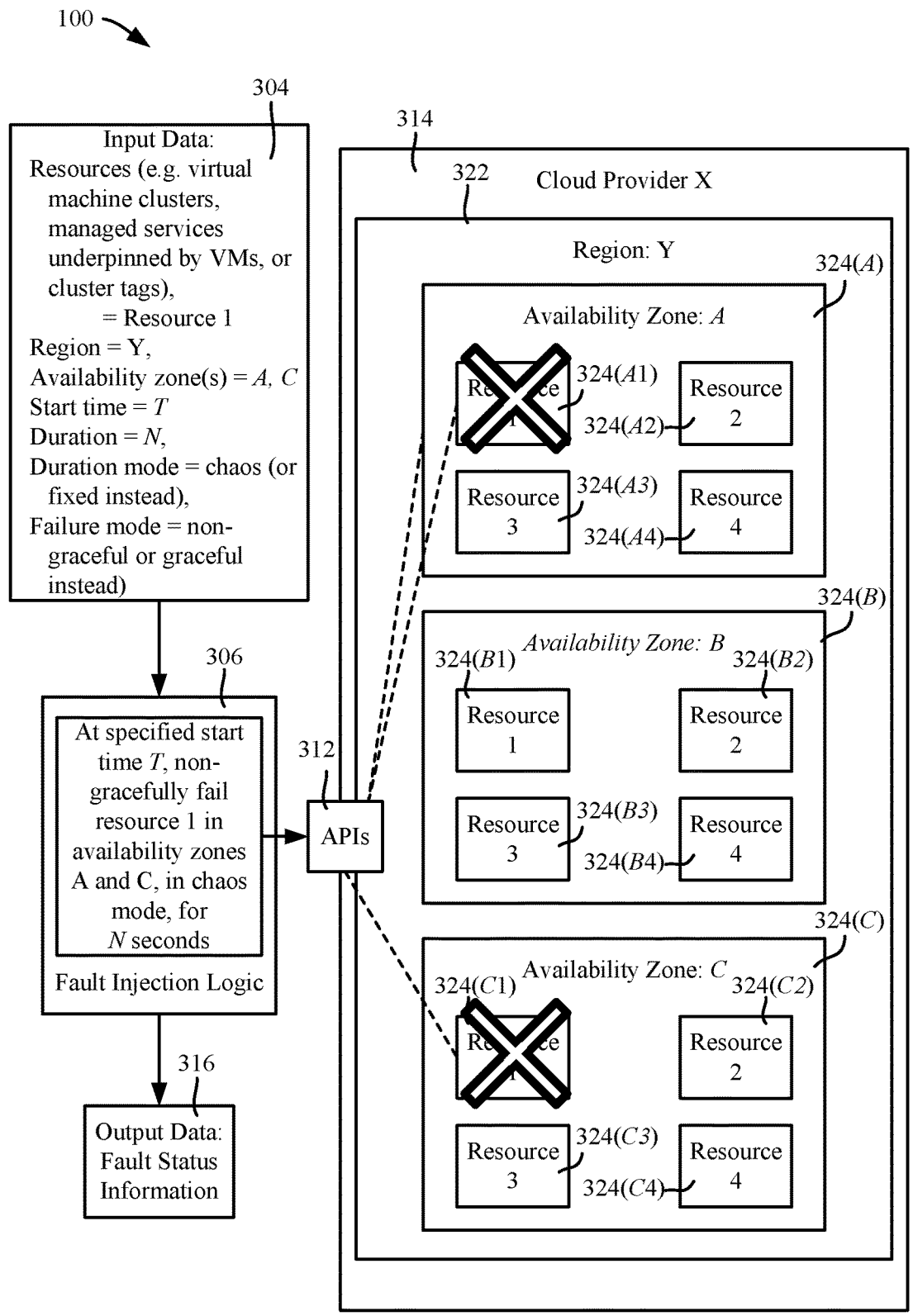
FIG. 3 is an example block diagram representation of an example system/architecture in which a faults has been injected to fail individual resources of two availability zones, in accordance with various embodiments and implementations of the subject disclosure.

FIG. 3 shows a different example, showing the injecting of faults to fail only specified resources based on (an instance of) the input data 304. As can be seen in FIG. 3, the input data 304 similarly includes, but is not limited to, identified resources, e.g., virtual machine (VM) clusters, managed services underpinned by VMs, or cluster tags.

As shown in FIG. 3, (similar to FIG. 2) the cloud provider has resources of a region Y 322 arranged in three availability zones, availability zone A 324(A), availability zone B 324(B) and availability zone C 324(C). Each availability zone has instances of the same resources running; in this example, availability zone A 324(A) has resources 324(A1), 324(A2), 324(A3) and 324(A4), availability zone B 324(B) has resources 324(B1), 324(B2), 324(B3), and 324(B4), and availability zone C 324(C) has resources 324(C1), 324(C2), 324(C3) and 324(C4).

As can be seen in FIG. 3, in this example, the input data 304 has specified that at a specified start time T, the fault injection logic is to non-gracefully fail (that is, perform a non-clean shutdown of) resource 1 (in chaos mode, that is, randomly) in availability zones A and C for a duration of N seconds. As represented by the large cross-out "x" characters in the region Y 322, by injection of the correctly directed faults, the resource 324(A1) of the availability zone A 324(A) and the resource 324(C1) of the availability zone C 324(C) are thus failed.

Figure 4:
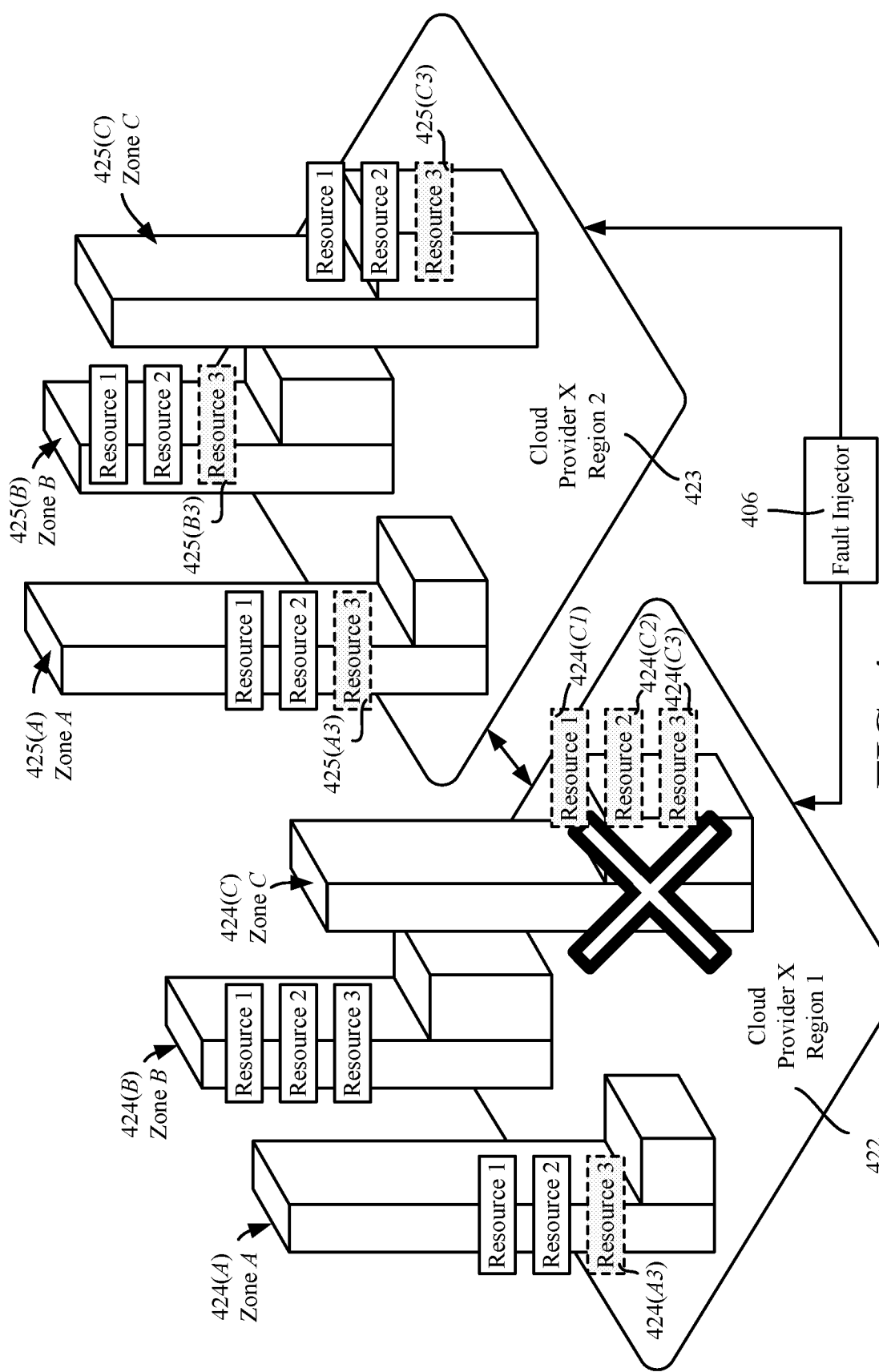
FIG. 4 is an example representation of injecting faults for failing one availability zone and individual resources of other availability zones, in accordance with various embodiments and implementations of the subject disclosure.

FIG. 4 shows another example, in which multiple (two) regions 422 and 423 have had faults injected to fail resources. Note that for clarity, only the resources that are failed are labeled, and are depicted with dashed, shaded blocks (compared to non-failed resources that are depicted with solid, unshaded blocks). As can be seen, in the region 422, resource 3 424(A3) of availability zone A 424(A) is in a failure state, while resource 1 424(C1), resource 2 424(C2) and resource 3 424(C3) of availability zone C 424(C) are in failure states (the entire availability zone C 424(C) has been failed). In the region 423, resource 3 425(A3), resource 3 425(B3) and resource 3 425(C3) of availability zones A 425(A), B 425(B) and C 425(C), respectively, are in failure states.

More complex input data can be specified, e.g., to include something such as:
Region=1, availability zone=A, resource(s)=3
   availability zone=C, resource(s)=1, 2, 3
Region=2, availability zone=A, resource(s)=3
   availability zone=B, resource(s)=3
   availability zone=C, resource(s)=3.

Note that although not explicitly shown, failure modes graceful (clean) or non-graceful (non-clean) can be specified for all regions, per individual region, per availably zone, or per resource (application/virtual machine/VM cluster/service/cluster tag/other entity that can be failed), that is, failure modes can be at different granularity levels. Similarly, fixed or chaos modes can be specified at any granularity level. A more-specific granularity level can override a more general granularity level, e.g., availability zone=C=fixed mode, resource(s)=1, 2, 3; resource 3=chaos mode and the like. Default modes can be used for any non-specified modes. Start times and/or durations can be different, although generally each would be the same for an entire test. Note that if a duration is unspecified, instead of time expiry being the stopping criterion, the duration is to be unlimited until manually stopped (or stopped by some other stopping criterion, such as a maximum timeout in case manual stopping is not working). Indeed, any variable can be specified via a suitable user interface, (which can also be configured to detect conflicts or non-feasible scenarios).

Another option (further described with reference to FIG. 5) is to specify whether a resource or the like that is in chaos mode is to also be randomly restored once failed. For example, consider that at time t1 cluster tag Q is randomly selected for failure; (note that the time t1 can be a random time as well). Whether to leave cluster tag Q in a failure state for the rest of the test or restore the cluster tag Q to an operational state at a time t2 (remove the fault) is an option. The time t2 can also be random, or can be based on the time t1 plus some failure duration, e.g., fail cluster tag Q in chaos mode and randomly remove the fault or remove the fault 1800 seconds after it fails (if it indeed is randomly failed). Whether to force a random failure also can be an option, e.g., fail in chaos mode at a random time within the first X seconds of the specified duration.

To summarize, the technology described herein obtains input data (e.g., from users) and based on the input data, automatically injects faults to the specified resources/entities. The input data can include, but is not limited to:

Resource(s): specify all, single or multiple resources (e.g., virtual machine clusters, cluster tags, or managed services underpinned by VM clusters).

Availability zone(s): specify a single or multiple availability zones.

Start time: the time to start injecting faults.

Duration: the length of time for which faults are to be injected/remain injected (or for unlimited time/until manually stopped).

Duration mode: Fixed or Chaos. Fixed mode applies the fault(s) continuously to the selected resources for the duration specified. Chaos mode will randomly inject failures for each resource individually rather than having a fault injected to fail the resources at the same time. In addition, this mode can remove the fault and add the fault back in repeatedly (e.g., by default), or once failed, leave the failure state of the resource failed (e.g., by a specific input data setting).

Failure mode: whether or not faults should be applied in a graceful (e.g., clean shutdown) or non-graceful fashion (e.g., non clean shutdown/hard fault like pulling the power cord). Note that cloud providers typically provide a graceful (e.g., clean shutdown) and non-graceful (e.g., hard fault/pulling the power cord) method for shutting down resources; depending on a use case, one or both methods can be significant in understanding the impact of such failures for improving system reliability.

Based on the input data, the technology described herein injects a fault using the specified (or default if unspecified) modes, thereby impacting the specified resource(s) in the selected availability zone(s) for the duration (if any) entered. The system outputs the status information related to the fault(s) during the duration for real time analysis, and, as set forth herein, can also save the status information/report the status information for subsequent analysis. Once the duration is complete, the fault(s) are removed, and the resources are powered back on or reenabled, depending on the resource type.

It should be noted that the technology described herein is generally directed towards offline testing in a test/development environment that uses a cloud provider's resources to simulate a production environment; however, this is not a requirement, as online testing in an actual production environment is feasible, particularly (but not necessarily) if the cloud provider is performing the test. For a customer of the cloud provider, some limitations would be enforced, e.g., tests are scoped for tenancy in a multi-tenancy environment (one customer can only impact their own resources, such as during a slow time to see what happens in conjunction with actual usage, such as if offline testing is not detecting an issue that occurs in online usage).

Figure 5:
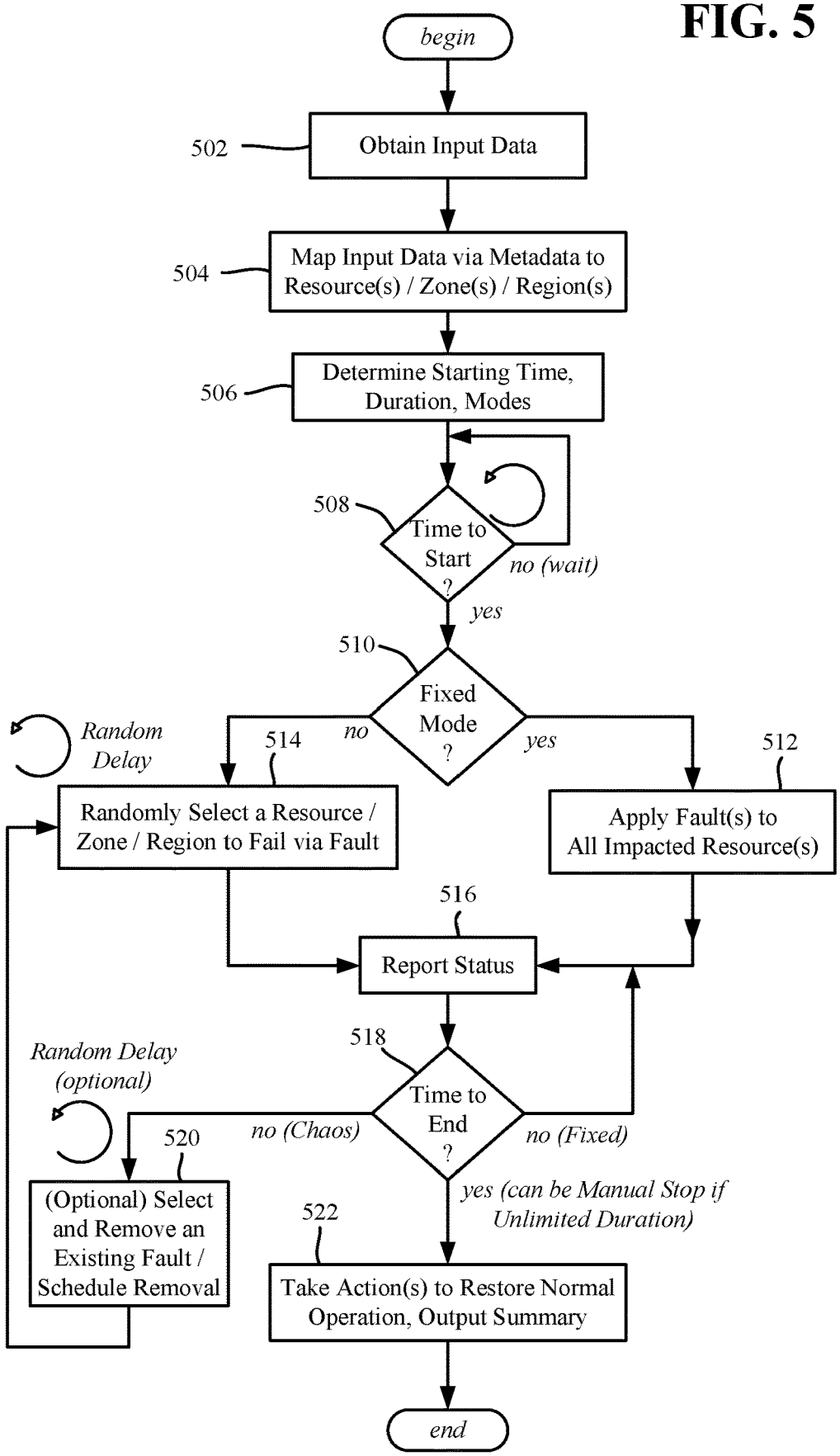
FIG. 5 is a flow diagram showing example operations related to logic for injecting one or more faults based on various input criteria, in accordance with various embodiments and implementations of the subject disclosure.

FIG. 5 is a flow diagram showing example operations related to a fault injection system as generally described herein. Note that this is only one non-limiting example to summarize some of the possible operations, and that many other ways to operate a fault injection system based on the technology described herein are feasible.

FIG. 502 represents obtaining the input data. FIG. 504 maps the input data via metadata to the resources, zones, and regions. As set forth herein, any resource that can be failed has metadata maintained for it in the cloud, and this metadata can be accessed by the cloud provider and returned so as to identify an individual resource for failure injection. The fault injection system can perform straightforward mapping to simplify the input data, e.g., "fail all resources X in all availability zones" can be mapped to identification data for region 1, availability zones A-D, resource X(A)-X(D); region 2, availability zones A-D, resource X(A)-X(D), and so on.

Operation 506 determines the starting time(s), duration (if any) and the modes from the input data. As described herein, default data can be used for any non-specified input data, and if any conflict or problem is detected with the input data (e.g., failover is not possible due to a lack of remaining non-failed resources), a notification can be output requesting correction of the issue; (conflict/problem detection is not explicitly shown in FIG. 5). Note a suitable user interface can prevent conflicts from being entered into the input data in the first place, e.g., a user can only select chaos mode or fixed mode for a given resource, not both.

Operation 508 represents waiting for the start time to be reached. The start can be right away once the test is submitted to the system for running, e.g., if a start time is not specified.

Operation 510 evaluates whether the input data has specified the fixed mode or the chaos mode of operation for the duration. Note that in the example of FIG. 5 this mode is specified for all impacted resources, although as set forth herein, in other scenarios such modes can be set to a finer granularity, e.g., per resource. Thus, although not explicitly shown, before operation 510 each resource can be individually selected with respect to specific mode-based handling (as well as possibly for an individual fault start time and/or duration).

If fixed mode was specified in the input data, operation 512 applies the corresponding type of fault to the impacted resource(s), e.g., graceful or non-graceful as specified in the input data (which can be for all impacted resources or per resource). If chaos mode was specified, operation 514 randomly selects a resource (which can be an entire zone's resources or, an entire region's resources), and (possibly) after some random time delay, injects the corresponding type of fault directed to the impacted resource(s), e.g., graceful or non-graceful as specified in the input data (which again, can be for all impacted resources or per resource). Note that a resource already in a failure state will not be considered during the random selection. Note further that the time of injection can be random as well, so that resources are failed gradually (otherwise chaos mode could be very much like the fixed mode); the duration can be factored into the delay time, e.g., for a two-hour duration, the longest delay time may be on the order of minutes.

Operation 516 represents reporting the status information, e.g., for real-time analysis. Note that the status can be reported regularly or whenever an event occurs, even in fixed mode, because one resource's failure may impact another resource, but only after some time.

Operation 518 repeats the process until the end time is reached. For the fixed mode, no more faults are to be applied, and thus operation 518 returns to operation 516 to report any (e.g., new) status information. For the chaos (random) mode, operation 518 branches to (optional) operation 520 which can select a failed resource and remove an existing fault, (or schedule a fault to be removed, e.g., after some random time delay). Operation 514 is then performed to randomly fail a next resource at some (e.g., random) time and so on.

When the stopping criterion is reached, e.g., the specified duration time expires or a manual stop is detected, operation 522 is performed to restore normal operation of the resources, e.g., restore power or reenable the resource, depending on the resource type. A summary or the like can be output for subsequent analysis.

To summarize, the technology described herein provides numerous features, including but not limited to a streamlined user interface, real-time status updates related to fault injection, the targeting of zones, different failure methods (graceful or non-graceful), multiple failure modes (fixed or chaos), and a tool that automates the fault injection and removal of the fault(s). Automation as described herein performing fault injection of the zone(s) more straightforward and accurate, in contrast to manual methods that are time consuming and highly error prone. The technology described herein is parameterized for different shutdown patterns and scenarios.

The following presents some example cloud services/resources from example cloud service providers (AMAZON AWS, GOOGLE GCP and MICROSOFT AZURE):

Compute Services:
   AWS: ELASTIC COMPUTE CLOUD (EC2), AWS LAMBDA, AWS ELASTIC BEANSTALK.
   GCP: COMPUTE ENGINE (GCE), CLOUD FUNCTIONS, APP ENGINE.
   AZURE: AZURE VIRTUAL MACHINES, AZURE FUNCTIONS, AZURE APP SERVICE.

Storage and Database Services:
   AWS: SIMPLE STORAGE SERVICE (S3), ELASTIC BLOCK STORE (EBS), DYNAMODB, RELATIONAL DATABASE SERVICE (RDS).
   GCP: CLOUD STORAGE, CLOUD PERSISTENT DISK, CLOUD BIGTABLE, CLOUD SQL.
   AZURE: AZURE BLOB STORAGE, AZURE DISK STORAGE, AZURE COSMOS DB, AZURE SQL DATABASE.

Networking Services:
   AWS: VIRTUAL PRIVATE CLOUD (VPC), ROUTE 53, AWS DIRECT CONNECT.
   GCP: VIRTUAL PRIVATE CLOUD (VPC), CLOUD DNS, CLOUD INTERCONNECT.
   AZURE: VIRTUAL NETWORK (VNET), DNS, EXPRESSROUTE.

Analytics and Big Data Services:
   AWS: S3, REDSHIFT, KINESIS, ATHENA.
   GCP: BIGQUERY, CLOUD PUB/SUB, CLOUD DATAFLOW, CLOUD DATAPROC.
   AZURE: SYNAPSE ANALYTICS, EVENT HUBS, STREAM ANALYTICS, DATABRICKS.

Machine Learning and AI Services:
   AWS: SAGEMAKER, REKOGNITION, COMPREHEND, POLLY.
   GCP: CLOUD AI PLATFORM, CLOUD VISION, CLOUD NATURAL LANGUAGE, CLOUD SPEECH-TO-TEXT.
   AZURE: MACHINE LEARNING, COGNITIVE SERVICES, TEXT ANALYTICS, SPEECH SERVICES.

Developer Tools and Devops Services:
   AWS: AWS CODECOMMIT, AWS CODEPIPELINE, AWS CODEDEPLOY, AWS CODEBUILD.
   GCP: CLOUD SOURCE REPOSITORIES, CLOUD BUILD, CLOUD DEPLOYMENT MANAGER.
   AZURE: DEVOPS, APP SERVICE, FUNCTIONS, CONTAINER REGISTRY.

Internet of Things (IOt) Services:
   AWS: AWS IoT CORE, AWS IoT ANALYTICS, AWS IoT GREENGRASS.
   GCP: CLOUD IoT CORE, CLOUD PUB/SUB, CLOUD IoT EDGE.
   AZURE: IoT HUB, AZURE IoT CENTRAL, EVENT GRID.

Security and Identity Services:
   AWS: AWS IDENTITY AND ACCESS MANAGEMENT (IAM), AWS KEY MANAGEMENT SERVICE (KMS), AWS SHIELD, AWS WEB APPLICATION FIREWALL (WAF).
   GCP: CLOUD IDENTITY AND ACCESS MANAGEMENT (IAM), CLOUD KEY MANAGEMENT SERVICE (KMS), CLOUD ARMOR.
   AZURE: ACTIVE DIRECTORY (AD), KEY VAULT, AZURE SECURITY CENTER, AZURE WEB APPLICATION FIREWALL (WAF).

Figure 6:
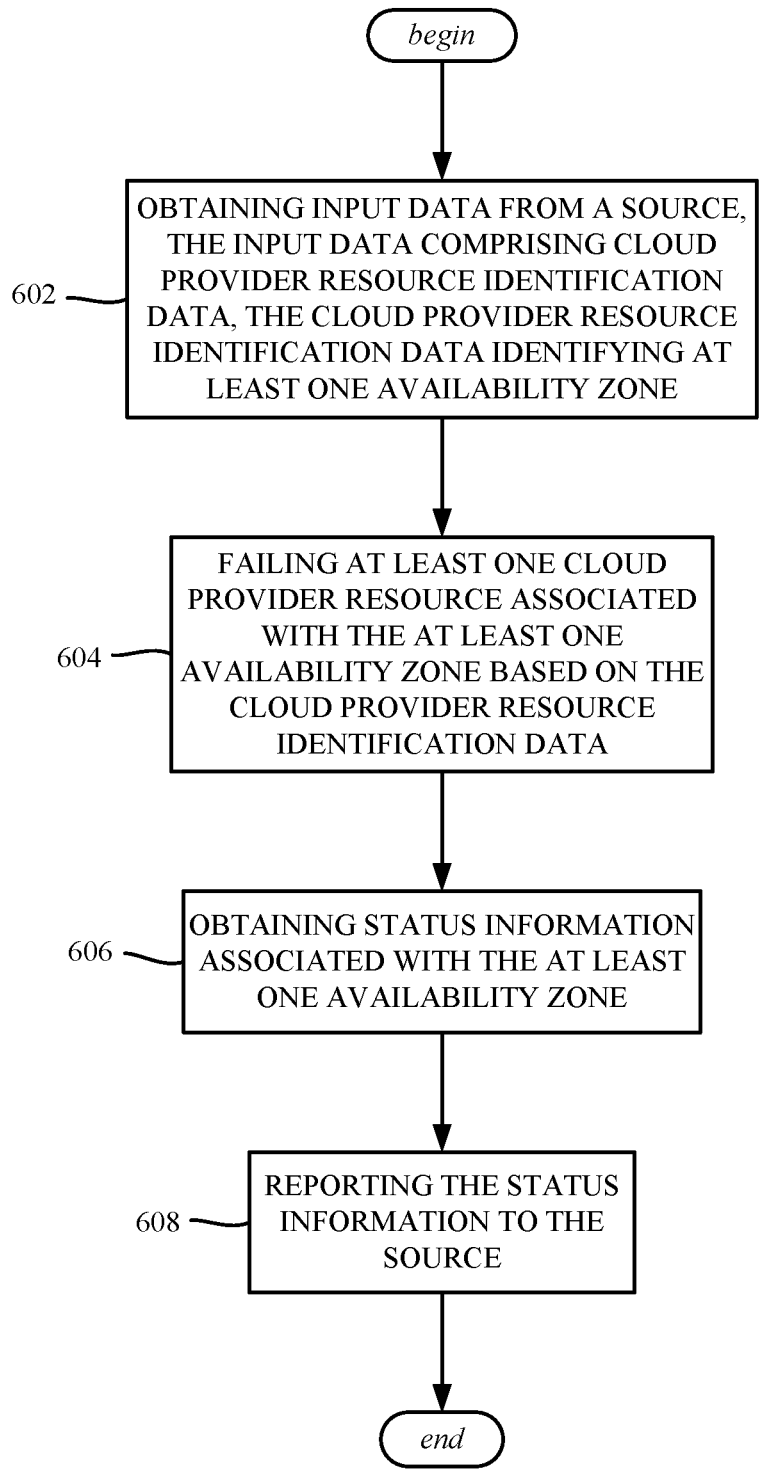
FIG. 6 is a flow diagram showing example operations related to failing at least one cloud provider associated with an availability zone based on cloud provider resource identification data obtained via input data, in accordance with various embodiments and implementations of the subject disclosure.

One or more embodiments can be embodied in a network device, such as represented in the example operations of FIG. 6, and for example can include a memory that stores computer executable components and/or operations, and a processor that executes computer executable components and/or operations stored in the memory. Example operations can include operation 602, which represents obtaining input data from a source, the input data comprising cloud provider resource identification data, the cloud provider resource identification data identifying at least one availability zone. Example operation 604 represents failing at least one cloud provider resource associated with the at least one availability zone based on the cloud provider resource identification data. Example operation 606 represents obtaining status information associated with the at least one availability zone. Example operation 608 represents reporting the status information to the source.

The source can include a user interface, and the input data can include user input.

The cloud provider resource identification data can identify a region, and at least one availability zone can be associated with the region.

At least one cloud provider resource associated with the at least one availability zone can include a resource of the at least one availability zone, and failing the at least one cloud provider resource can include injecting a fault directed to the resource via a cloud provider interface. The resource of the at least one availability zone can include at least one of: a virtual machine cluster, a predefined grouping of resources, or a managed service.

At least one cloud provider resource associated with the at least one availability zone can include an entire group of resources of the at least one availability zone.

The input data can specify a start time, and failing the at least one cloud provider resource can occur based on reaching the start time.

The input data can specify a duration, and failing the at least one cloud provider resource can continue until expiry of the duration.

The input data can specify a fixed mode, and the failing the at least one cloud provider resource can include applying a continuous fault to the at least one cloud provider resource until a stopping criterion is satisfied.

The input data can specify a random mode, the at least one cloud provider resource can include a first resource and a second resource, and failing the at least one cloud provider resource can include randomly selecting between the first resource and the second resource to determine a selected resource to fail, and injecting a fault for application to the selected resource. Further operations can include removing the application of the fault from the selected resource.

The input data can specify whether to fail the at least one cloud provider resource in a graceful mode or a non-graceful mode, and further operations can include, in response to the input data specifying the graceful mode, injecting a fault that results in a clean shutdown of the at least one cloud provider resource, and, in response to the input data specifying the non-graceful mode, injecting a hard fault that results in a non-clean shutdown of the at least one cloud provider resource.

Figure 7:
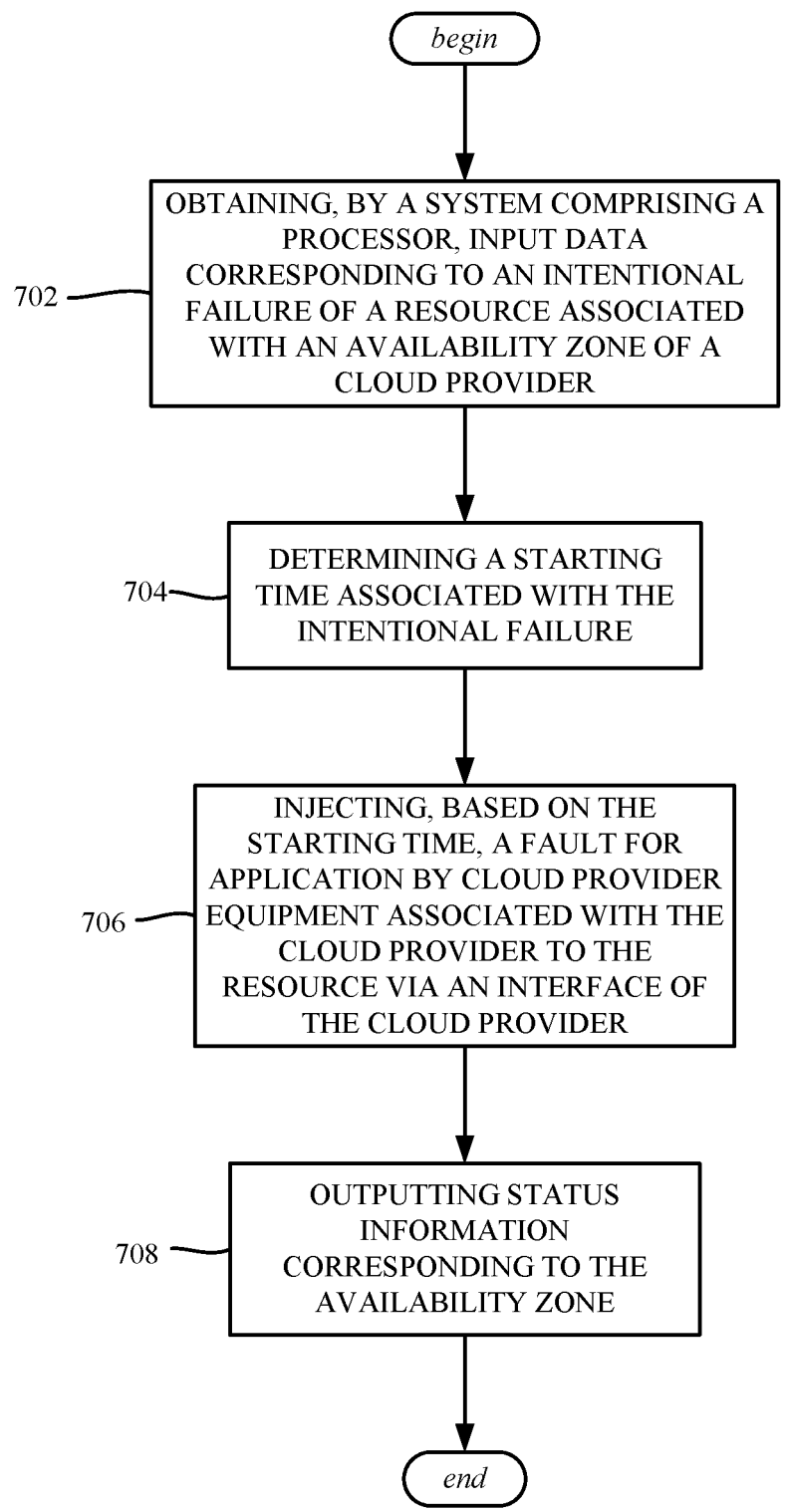
FIG. 7 is a flow diagram showing example operations related to injecting a fault for application by a cloud provider to a resource via an interface of the cloud provider, in accordance with various embodiments and implementations of the subject disclosure.

One or more example embodiments, such as corresponding to example operations of a method, are represented in FIG. 7. Example operation 702 represents obtaining, by a system comprising a processor, input data corresponding to an intentional failure of a resource associated with an availability zone of a cloud provider. Example operation 704 represents determining a starting time associated with the intentional failure. Example operation 706 represents injecting, based on the starting time, a fault for application by cloud provider equipment associated with the cloud provider to the resource via an interface of the cloud provider. Example operation 708 represents outputting status information corresponding to the availability zone.

The resource can be a first resource, the input data can specify a random fault injection mode, and further operations can include randomly selecting, by the system, between the first resource and a second resource to determine a selected resource to fail, and injecting the fault for application by the cloud provider equipment associated with the cloud provider to the selected resource.

Randomly selecting the selected resource can selects the first resource, injecting the fault can include injecting a first fault, and further operations can include injecting, by the system, a second fault for application by the cloud provider equipment associated with the cloud provider to the second resource, and removing the application of the first fault from the first resource.

The resource can be a first resource, the fault can be a first fault, and further operations can include injecting, by the system, a second fault for application by the cloud provider equipment associated with the cloud provider to a second resource in conjunction with the injecting of the first fault for application by the cloud provider equipment associated with the cloud provider to the first resource.

The availability zone can be a first availability zone of a group of availability zones, the resource can be a first resource instance, wherein the fault can be a first fault, the input data can specify the resource, the first availability zone and a second availability zone, and further operations can include injecting, by the system, a second fault for application by the cloud provider equipment associated with the cloud provider to a second resource instance associated with a second availability zone in conjunction with the injecting of the first fault, the second resource instance corresponding to the first resource instance.

Figure 8:
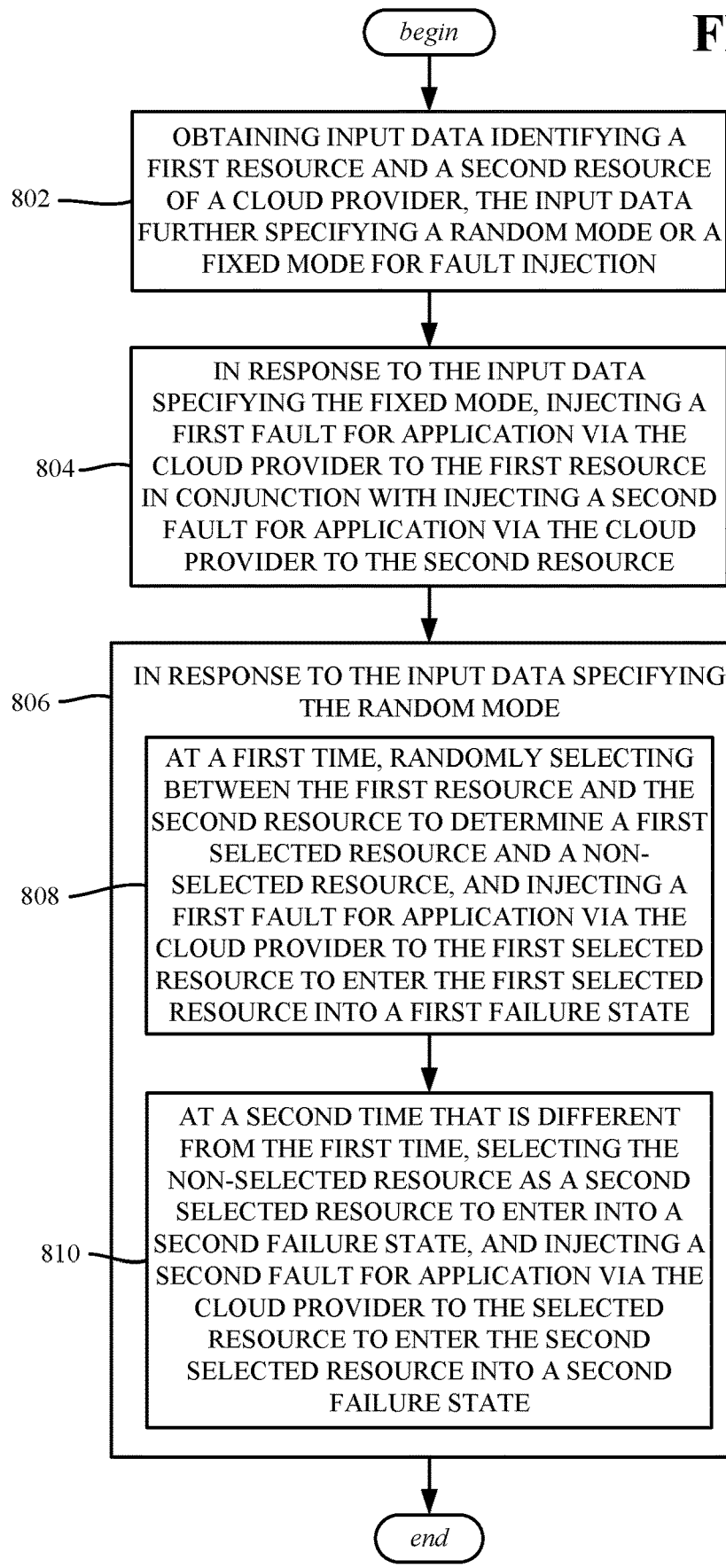
FIG. 8 is a flow diagram showing example operations related to injecting faults based on whether a fixed mode or random mode is specified via input data, in accordance with various embodiments and implementations of the subject disclosure.

FIG. 8 summarizes various example operations, e.g., corresponding to a machine-readable medium, comprising executable instructions that, when executed by a processor, facilitate performance of operations. Example operation 802 represents obtaining input data identifying a first resource and a second resource of a cloud provider, the input data further specifying a random mode or a fixed mode for fault injection. Example operation 804 represents, in response to the input data specifying the fixed mode, injecting a first fault for application via the cloud provider to the first resource in conjunction with injecting a second fault for application via the cloud provider to the second resource. Example operation 806 represents, in response to the input data specifying the random mode, at a first time, randomly selecting between the first resource and the second resource to determine a first selected resource and a non-selected resource, and injecting a first fault for application via the cloud provider to the first selected resource to enter the first selected resource into a first failure state (example operation 808), and at a second time that is different from the first time, selecting the non-selected resource as a second selected resource to enter into a second failure state, and injecting a second fault for application via the cloud provider to the selected resource to enter the second selected resource into a second failure state (example operation 810).

The input data can specify the random mode and further operations can include randomly selecting between the first selected resource in the first failure state and the second selected resource in the second failure state; randomly selecting between the first selected resource in the first failure state and the second selected resource in the second failure state can select the second selected resource in the second failure state, and, at a third time that is after the first time and the second time, can restore the second resource in the second failure state from the second failure state to an operational state.

Further operations can include, at a fourth time that is after the third time, injecting a third fault for application by the cloud provider to the second resource to enter the second resource into a third failure state.

As can be seen, the technology described herein facilitates customizable and precise fault injection process tailored for public cloud environments. This allows users to simulate and test different failure scenarios by applying various combinations of fault duration modes and failure modes to specific resources in availability zones. The technology described herein addresses zonal controls, multi-tenancy, scalability, and public cloud-native technology integration via user-friendly automated fault injection system for cloud-based systems, e.g., allowing users to target specific resources and availability zones with fixed or chaos modes of fault injection and different types of failures. The technology described herein also provides real-time status updates and the ability to specify the duration of the fault injection, making it a useful tool for testing and improving system reliability.

Figure 9:
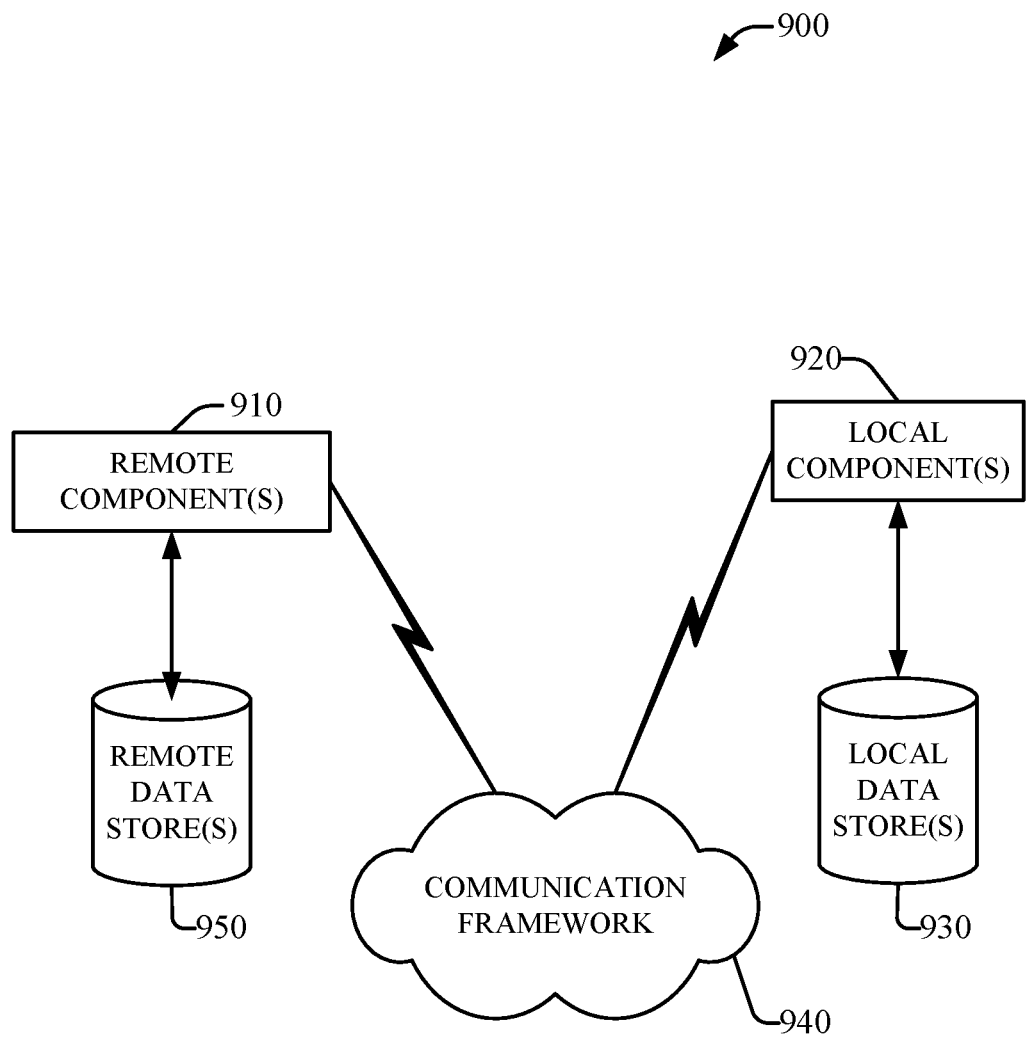
FIG. 9 is a block diagram representing an example computing environment into which embodiments of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s)

910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
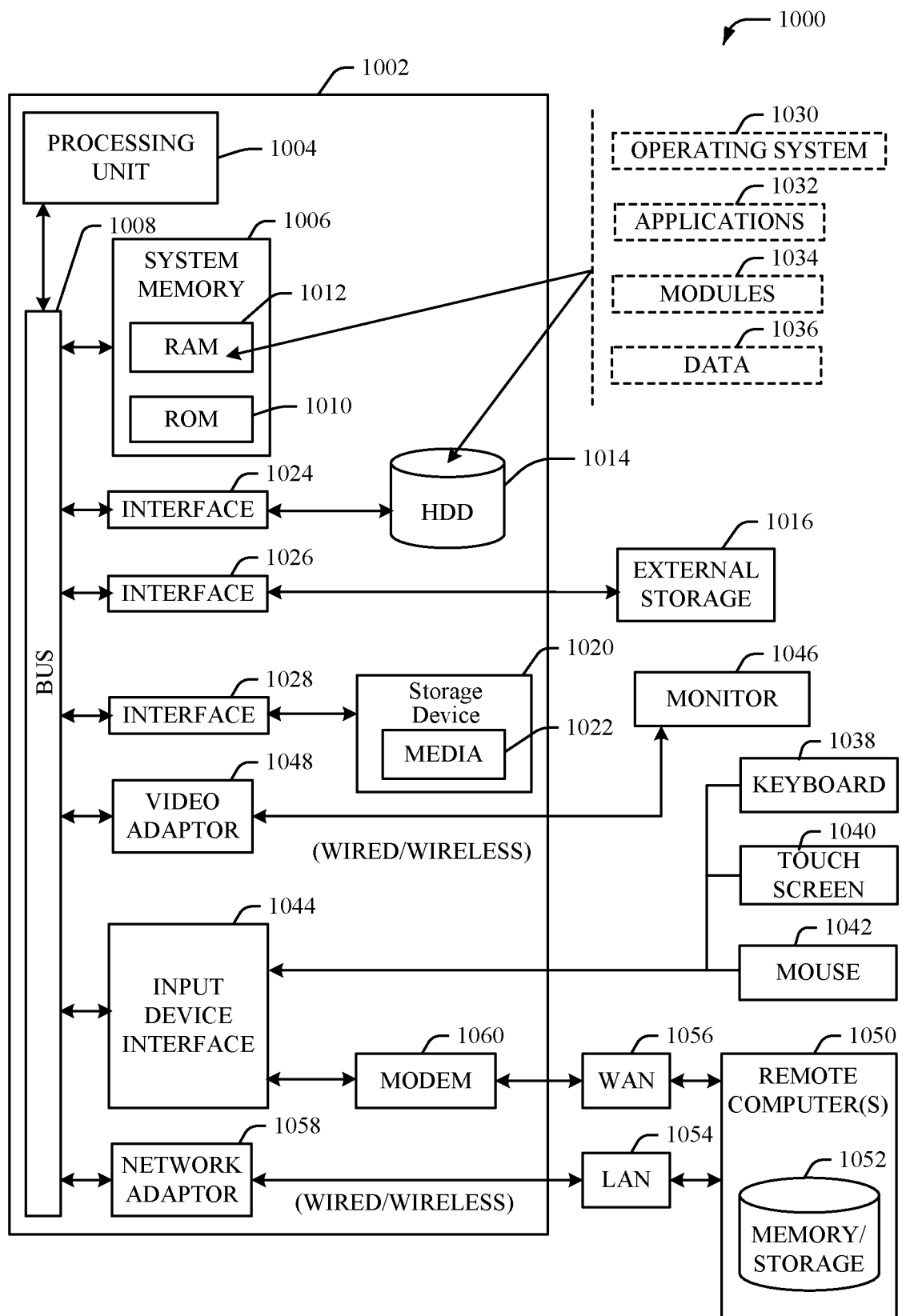
FIG. 10 depicts an example schematic block diagram of a computing environment with which the disclosed subject matter can interact/be implemented at least in part, in accordance with various embodiments and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
obtaining, from a source, input data corresponding to an intentional failure of a first computer resource associated with an availability zone of a cloud-based distributed computing system, wherein the input data specifies a random fault injection mode;
determining a starting time associated with the intentional failure;
randomly selecting between the first computer resource of the cloud-based distributed computing system and a second computer resource of the cloud-based distributed computing system;
in response to randomly selecting the first computer resource:
transmitting, based on the starting time, via an interface of the cloud-based distributed computing system, a first call that initiates a first failure of the first computer resource of the cloud-based distributed computing system,
transmitting, via the interface of the cloud-based distributed computing system, a second call that initiates a second failure of the second computer resource of the cloud-based distributed computing system, and
transmitting, via the interface of the cloud-based distributed computing system, a third call that undoes the first failure of the first computer resource and re-enables the first computer resource; and
outputting failover result status information corresponding to the availability zone.

2. The system of claim 1, wherein the source comprises a user interface, and wherein the input data comprises user input.

3. The system of claim 1, wherein the input data identifies a region, and wherein the at least one availability zone is associated with the region.

4. The system of claim 1, wherein the first computer resource comprises at least one of: a virtual machine, a virtual machine cluster, a predefined grouping of computer resources, an application, or a managed service.

5. The system of claim 1, wherein the input data further specifies the starting time, and wherein the failing of the first computer resource occurs based on reaching the starting time.

6. The system of claim 1, wherein the input data further specifies a duration, and wherein the failing of the first computer resource continues until expiry of the duration.

7. The system of claim 1, wherein the input data further specifies whether to fail the first computer resource in a graceful mode or a non-graceful mode, and wherein the operations further comprise, in response to the input data specifying the graceful mode, injecting a fault that results in a clean shutdown of the first computer resource, and, in response to the input data specifying the non-graceful mode, injecting a hard fault that results in a non-clean shutdown of the first computer resource.

8. A method, comprising:
obtaining, by a system comprising a processor, input data corresponding to an intentional failure of a first computer resource associated with an availability zone of a cloud-based distributed computing system, wherein the input data specifies a random fault injection mode;
determining, by the system, a starting time associated with the intentional failure;
randomly selecting, by the system, between the first computer resource of the cloud-based distributed computing system and a second computer resource of the cloud-based distributed computing system;
in response to randomly selecting the first computer resource:
transmitting, by the system, based on the starting time, via an interface of the cloud-based distributed computing system, a first call that initiates a first failure of the first computer resource of the cloud-based distributed computing system,
transmitting, by the system, via the interface of the cloud-based distributed computing system, a second call that initiates a second failure of the second computer resource of the cloud-based distributed computing system, and
transmitting, by the system, via the interface of the cloud-based distributed computing system, a third call that undoes the first failure of the first computer resource and re-enables the first computer resource; and
outputting, by the system, failover result status information corresponding to the availability zone.

9. The method of claim 8, wherein the availability zone is a first availability zone of a group of availability zones, wherein the input data specifies the first computer resource, the first availability zone and a second availability zone, wherein the second computer resource is associated with a second availability zone, and wherein the second computer resource corresponds to the first computer resource.

10. The method of claim 8, wherein the input data further specifies a region, and wherein the at least one availability zone is associated with the region.

11. The method of claim 8, wherein the first computer resource comprises at least one of: a virtual machine, a virtual machine cluster, a predefined grouping of computer resources, an application, or a managed service.

12. The method of claim 8, wherein the input data further specifies the starting time, and wherein the failing of the first computer resource occurs based on reaching the starting time.

13. The method of claim 8, wherein the input data further specifies a duration, and wherein the failing of the first computer resource continues until expiry of the duration.

14. The method of claim 8, wherein the input data further specifies whether to fail the first computer resource in a graceful mode or a non-graceful mode, and wherein the operations further comprise, in response to the input data specifying the graceful mode, injecting a fault that results in a clean shutdown of first computer resource, and, in response to the input data specifying the non-graceful mode, injecting a hard fault that results in a non-clean shutdown of the first computer resource.

15. A non-transitory machine-readable medium, comprising executable instructions that, when executed by a processor, facilitate performance of operations, the operations comprising:
obtaining input data identifying a first computing resource and a second computing resource of a cloud-based distributed computing system, the input data further specifying a random mode or a fixed mode for fault injection;

in response to the input data specifying the fixed mode, transmitting, via an interface of the cloud-based distributed computing system, a first call that initiates a first failure of the first computing resource of the cloud-based distributed computing system in conjunction with initiating a second failure of the second computing resource of the cloud-based distributed computing system; and in response to the input data specifying the random mode,
- at a first time, randomly selecting between the first computing resource and the second computing resource to determine a first selected computing resource and a non-selected computing resource, and transmitting, via the interface of the cloud-based distributed computing system, a second call that initiates the first selected computing resource to enter into a first failure state;
- at a second time that is different from the first time, selecting the non-selected resource as a second selected computing resource to enter into a second failure state, transmitting, via the interface of the cloud-based distributed computing system, a third call that initiates the selected computing resource to enter into a second failure state.

16. The non-transitory machine-readable medium of claim 15, wherein the input data specifies the random mode, wherein the operations further comprise randomly selecting between the first selected computing resource in the first failure state and the second selected computing resource in the second failure state, and wherein the randomly selecting between the first selected computing resource in the first failure state and the second selected computing resource in the second failure state selects the second selected computing resource in the second failure state, and, at a third time that is after the first time and the second time, restoring the second selected computing resource in the second failure state from the second failure state to an operational state.

17. The non-transitory machine-readable medium of claim 16, wherein the operations further comprise, at a fourth time that is after the third time, in transmitting, via the interface of the cloud-based distributed computing system, a fourth call that initiates the second selected computing resource to enter into a third failure state.

18. The non-transitory machine-readable medium of claim 15, wherein the input data further specifies a region, and wherein the at least one availability zone is associated with the region.

19. The non-transitory machine-readable medium of claim 15, wherein the first computing resource comprises at least one of: a virtual machine, a virtual machine cluster, a predefined grouping of computing resources, an application, or a managed service.

20. The non-transitory machine-readable medium of claim 15, wherein the input data further specifies whether to fail the first computing resource in a graceful mode or a non-graceful mode, and wherein the operations further comprise, in response to the input data specifying the graceful mode, injecting a fault that results in a clean shutdown of first computing resource, and, in response to the input data specifying the non-graceful mode, injecting a hard fault that results in a non-clean shutdown of the first computing resource.

* * * * *